United States Patent Office 3,278,577
Patented Oct. 11, 1966

3,278,577
ORGANOPHOSPHORUS COMPOUNDS
Frank M. Cowen, North Plainfield, N.J., and William Alan Burris, Rochester, N.Y., assignors to American Cyanamid Company, Stamford, Conn., a corporation of Maine
No Drawing. Filed Dec. 26, 1963, Ser. No. 333,741
1 Claim. (Cl. 260—465.6)

The present invention relates to novel and useful organophosphorus compounds and to the preparation thereof. More particularly, the present invention relates to bridged diphosphines (C) produced according to the following general equation

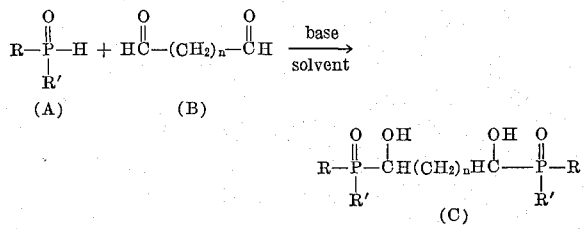

wherein R and R' each represent substituted and unsubstituted alkyl having from 1 to 18 carbon atoms, substituted and unsubstituted alkenyl having from 1 to 18 carbon atoms, cycloalkyl, substituted cycloalkyl, aryl and substituted aryl; and $n$ is a value from 0 to 18.

According to a particular embodiment of the instant discovery bis(-cyanoethyl)phosphine oxide and methanol are admixed in solution, and added thereto are glyoxal and pentamethylguanidine according to the following equation:

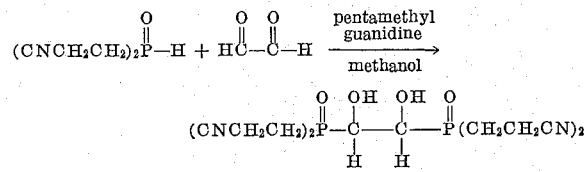

Typical secondary phosphine oxides (A) within the purview of the present invention are the oxides of:

diethylphosphine,
diisopropylphosphine,
bis(1-ethylpropyl)phosphine,
dicyclopentylphosphine,
diphenylphosphine,
bis(2-cyanoethyl)phosphine,
diallylphosphine,
dibutylphosphine,
diisobutylphosphine,
didodecylphosphine,
bis(2-phenylethyl)phosphine,
dicyclohexylphosphine,
bis(3-ethylhexyl)phosphine,
bis(2,4,4-trimethylpentyl)phosphine,
bis(3-chloropropyl)phosphine,
bis(2-butenyl)phosphine,
ethylhexylphosphine,
dioctylphosphine,
diisooctylphosphine,
bis(3-methoxycyclohexyl)phosphine,
bis(3-ethoxycyclopentenyl)phosphine,
bis(2-phenoxyethyl)phosphine,
bis(2-hydroxyethyl)phosphine,
bis(p-chlorophenyl)phosphine,
bis(hydroxymethyl)phosphine,
bis(1-hydroxyhexyl)phosphine,
bis(3-carboxypropyl)phosphine,
bis(3-carbethoxypropyl)phosphine.

It has been found, according to the instant discovery, that numerous aldehydes of the formula (B) above are useful in the process of the present invention, the following being only typical: glyoxal, succinaldehyde, glutaraldehyde, adipaldehyde, pimelaldehyde, sebacaldehyde, suberaldehyde, etc.

Among the bases useful herein are: ammonium hydroxide, alkali metal hydroxides and carbonates, alkaline earth metal hydroxides and carbonates, quaternary ammonium hydroxides, tetramethylguanidine, pentamethylguanidine, hexaalkyl(lower)- and heptaalkyl(lower)-biguanides, primary, secondary and tertiary alkyl(lower) amines, alkali metal alkoxides, e.g., sodium methoxide, potassium ethoxide, and the like.

The solvents preferred herein are the lower alkanols, such as methanol, ethanol, propanol and butanol, among which methanol is best suited. Other suitable inert organic solvents are the ethers, such as tetrahydrofuran, dioxane, and the like.

For best results, the secondary phosphine oxide (A) and the aliphatic dialdehyde (B) reactants are brought together in the presence of a lower alkanol and a strong base (of the type defined above) at a temperature in the range of about 0° C. and the boiling point of the solvent. Generally, temperatures between 60° C. and 65° C. are employed.

While very satisfactory results are achieved using stoichiometric amounts of the reactants, viz., 2 moles of the secondary phosphine oxide per mole of the dialdehyde, the ratio of these reactants to one another is not critical. In other words, greater than stoichiometric or even less than stoichiometric amounts may be used without altering the nature of the reaction.

Insofar as the base is concerned, only a small amount thereof is needed. While amounts in the range of 0.01% to 15% may be used, based upon the combined weight of (A) and (B), from 0.1% to 4% is preferred.

It has been found that undesirable side reactions are kept to a minimum by the addition of the base to the heated reaction mixture. By the same token, addition of all the base at once enhances the reaction.

The reactions of the present invention may be carried out at atmospheric, sub-atmospheric or super-atmospheric pressures. It will be evident to the person skilled in the art that an increase in pressure permits a proportional increase in temperature without upsetting the reaction. Batch, semi-continuous or continuous processes may be employed.

The present invention will best be understood from the following examples which are intended to illustrate and not to limit the scope of the present invention.

*Example I*

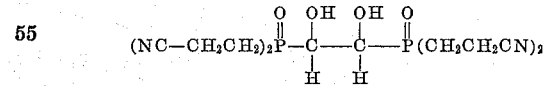

To a solution of 1.0 part (0.0064 mole) of bis(2-cyanoethyl)phosphine oxide in 16 parts of methanol, there is added 0.25 part (0.0032 mole) of glyoxal. The mixture is heated to about 60° C. and a catalytic amount 0.1 of pentamethyl guanidine is added. When the exothermic reaction is finished (about 2 minutes), the reaction mixture is cooled, and the product is separated by filtration. After recrystallization from water, the product melts at 213–214° C.

*Analysis.*—Calculated for $C_{14}H_{20}N_4O_4P_2$: C, 45.3; H, 5.40; N, 15.1. Found: C, 45.8; H, 5.59; N, 15.1.

*Examples II–XIX*

Example I, above, is carried out in every essential respect, except as shown in the following table:

TABLE I

| Ex. No. | $\begin{array}{c}R\phantom{xx}O\\ \phantom{x}\backslash\phantom{x}\|\|\\ \phantom{xxx}P-H\\ /\\ R'\end{array}$ (A) | $\begin{array}{c}O\phantom{xxxxxx}O\\ \|\|\phantom{xxxxxx}\|\|\\ HC-(CH_2)_n-CH\end{array}$ (B) n | Percent | Base[1] | Solvent | Temp., °C. | $\begin{array}{c}R\phantom{x}O\phantom{x}OH\phantom{xxxx}OH\phantom{x}O\phantom{x}R\\ \backslash\phantom{x}\|\|\phantom{x}\|\phantom{xxxxx}\|\phantom{x}\|\|\phantom{x}/\\ P-CH(CH_2)_nHC-P\\ /\phantom{xxxxxxxxxxxxxxxxx}\backslash\\ R'\phantom{xxxxxxxxxxxxxxxxx}R'\end{array}$ (C) |
|---|---|---|---|---|---|---|---|
| II | Diethylphosphine oxide | 2 | 0.2 | NH₄OH | Butanol | (²) | [R, R', n have same meanings given them in columns (A) and (B) of this table]. |
| III | Dicyclopentylphosphine oxide | 3 | 2.0 | NaOH | Ethanol | (²) | |
| IV | Diphenylphosphine oxide | 4 | 0.5 | KOH | THF[7] | (²) | |
| V | Diallylphosphine oxide | 5 | 0.05 | TMG[3] | Dioxane | (²) | |
| VI | Didodecylphosphine oxide | 6 | 3.0 | PMG[1] | Methanol | (²) | |
| VII | Bis(2-phenylethyl)phosphine oxide | 8 | 5.0 | TEA[5] | do | (²) | |
| VIII | Dicyclohexylphosphine oxide | 10 | 1.0 | NeOCH₃ | do | (²) | |
| IX | Bis(2,4,4-trimethylpentyl)phosphine oxide. | 12 | 1.1 | Ca(OH)₂ | Propanol | (²) | |
| X | Bis(3-chloropropyl)phosphine oxide | 16 | 0.15 | NH₄OH | Ethanol | (²) | |
| XI | Bis(2-butenylphosphine) oxide | 18 | 0.04 | TMG[3] | THF[5] | (²) | |
| XII | Diisooctylphosphine oxide | 6 | 1.2 | DEA[6] | Butanol | (²) | |
| XIII | Bis(3-methoxycyclohexyl)phosphine oxide. | 8 | 1.8 | KOC₂H₅ | Ethanol | (²) | |
| XIV | Bis(3-ethoxycyclopentenyl)phosphine oxide. | 4 | 2.5 | Na₂CO₃ | Methanol | (²) | |
| XV | Bis(2-phenoxyethyl)phosphine oxide | 0 | 0.6 | KOH | THF[5] | (²) | |
| XVI | Bis(2-hydroxyethyl)phosphine oxide | 4 | 0.65 | NH₄OH | Propanol | (³) | |
| XVII | Bis(p-chlorophenyl)phosphine oxide | 6 | 1.3 | TEA[3] | Methanol | (²) | |
| XVIII | Bis(3-carboxypropyl)phosphine oxide | 3 | 1.8 | NaOH | Ethanol | (²) | |
| XIX | Bis(3-carbethoxypropyl)phosphine oxide. | 8 | 0.8 | Ca(OH)₂ | Methanol | (²) | |

[1] Based upon the combined weight of (A) and (B).
[2] Boiling point of solvent.
[3] Tetramethylguanidine.
[4] Pentamethylguanidine.
[5] Triethylamine.
[6] Diethylamine.
[7] Tetrahydrofuran.

The bridged diphosphine oxides (C) of the present invention are useful as gasoline additives. For example, up to about 10 milliliters of any one of these oxides, when dissolved in one gallon of gasoline, affords protection against misfiring, surface ignition, and the like.

Clearly, the instant discovery encompasses numerous modifications within the skill of the art. Consequently while the present invention has been described in detail with respect to specific embodiments thereof, it is not intended that these details be construed as limitations upon the scope of the invention, except insofar as they appear in the appended claim.

We claim:

$$(NC-CH_2CH_2)_2 \overset{O}{\underset{}{\overset{\|}{P}}} - \overset{OH}{\underset{H}{\overset{|}{C}}} - \overset{OH}{\underset{H}{\overset{|}{C}}} - \overset{O}{\underset{}{\overset{\|}{P}}}(CH_2CH_2CN)_2$$

References Cited by the Examiner

UNITED STATES PATENTS 3,116,317  12/1963  Grayson et al. __ 260—465.6 XR
3,116,334  12/1963  Buckler et al. ___ 260—465.6 XR
3,145,227   8/1964  Grayson et al. __ 260—465.6 XR CHARLES B. PARKER, *Primary Examiner.*
JOSEPH P. BRUST, *Examiner.*

UNITED STATES PATENT OFFICE
CERTIFICATE OF CORRECTION

Patent No. 3,278,577                              October 11, 1966

Frank M. Cowen et al.

It is hereby certified that error appears in the above numbered patent requiring correction and that the said Letters Patent should read as corrected below.

Column 1, line 30, for "bis(-cyanoethyl)" read -- bis (2-cyanoethyl) --; columns 3 and 4, TABLE I, fifth column, line 5 thereof, for "$PMG^1$" read -- $PMG^4$ --; same table, fifth column, line 7 thereof, for "$NeOCH_3$" read -- $NaOCH_3$ --; same table, fifth column, line 16 thereof, for "$TEA^3$" read -- $TEA^5$ --.

Signed and sealed this 29th day of August 1967.

(SEAL)
Attest:

ERNEST W. SWIDER                                    EDWARD J. BRENNER
Attesting Officer                                           Commissioner of Patents